United States Patent
Ko

(10) Patent No.: US 9,371,878 B2
(45) Date of Patent: Jun. 21, 2016

(54) APPARATUS FOR VARIABLE SHOCK ABSORPTION

(71) Applicant: Hyundai Motor Company, Seoul (KR)

(72) Inventor: Hun Keon Ko, Seoul (KR)

(73) Assignee: Hyundai Motor Company, Seoul (KR)

( * ) Notice: Subject to any disclaimer, the term of this patent is extended or adjusted under 35 U.S.C. 154(b) by 1 day.

(21) Appl. No.: 14/326,942

(22) Filed: Jul. 9, 2014

(65) Prior Publication Data

US 2015/0159720 A1 Jun. 11, 2015

(30) Foreign Application Priority Data

Dec. 6, 2013 (KR) .................. 10-2013-0151888

(51) Int. Cl.
*F16F 3/04* (2006.01)
*B25J 19/00* (2006.01)
*B25J 9/00* (2006.01)

(52) U.S. Cl.
CPC .................. *F16F 3/04* (2013.01); *B25J 9/0006* (2013.01); *B25J 19/0091* (2013.01)

(58) Field of Classification Search
CPC ............ F16F 3/04; F16F 15/02; F16F 15/04; F16F 15/06; F16F 15/067; F16F 7/116; F16F 7/104; F16C 11/00
USPC ............ 188/378–380; 267/136, 73, 150, 165, 267/179, 160, 372, 174
See application file for complete search history.

(56) References Cited

U.S. PATENT DOCUMENTS

| | | | | |
|---|---|---|---|---|
| 96,213 | A * | 10/1869 | English et al. | F16F 15/02 248/618 |
| 4,673,170 | A * | 6/1987 | Dykema | F41A 25/10 188/380 |
| 4,702,398 | A * | 10/1987 | Seager | A45D 40/02 222/105 |
| 4,789,145 | A * | 12/1988 | Wenrich | F01C 21/0845 267/154 |
| 7,798,298 | B2 * | 9/2010 | Smaldone | A43B 13/183 188/372 |

FOREIGN PATENT DOCUMENTS

| | | | |
|---|---|---|---|
| GB | 2501418 A * | 10/2013 | ............... F16F 3/04 |
| JP | S63-088528 U | 9/1988 | |
| JP | 2001-055482 A | 2/2001 | |
| JP | 2001-279950 A | 10/2001 | |
| JP | 2002-048191 A | 2/2002 | |
| KR | 10-2006-0020768 | 3/2006 | |
| KR | 10-0797907 | 1/2008 | |
| KR | 10-2010-0110188 | 10/2010 | |
| KR | 10-2011-0080922 | 7/2011 | |

* cited by examiner

*Primary Examiner* — Melanie Torres Williams
(74) *Attorney, Agent, or Firm* — Mintz Levin Cohn Ferris Glovsky and Popeo, P.C.; Peter F. Corless

(57) ABSTRACT

An apparatus for variable shock absorption is provided. The apparatus includes a pair of elastic members that cross each other and a first support that has both ends coupled to predetermined first ends of the elastic members. A second support faces the first support and has oblong grooves in which second ends of the elastic members are inserted to slide in opposite directions. When an external force is applied to the first support or the second support, the distance between the first support and the second support changes and the angle formed by the pair of elastic members changes based on the change of the distance between the supports.

7 Claims, 3 Drawing Sheets

APPARATUS FOR VARIABLE SHOCK ABSORPTION

CROSS-REFERENCE TO RELATED APPLICATION

This application claims under 35 U.S.C. §119(a) the benefit of Korean Patent Application No. 10-2013-0151888 filed Dec. 6, 2013, the entire contents of which are incorporated herein by reference.

BACKGROUND (a) Technical Field

The present invention relates to an apparatus for variable shock absorption, and more particularly to an apparatus for variable shock absorption that changes the amount of shock absorption with the degree of extension of an elastic member to attenuate instantaneous force applied to a robot using wires.

(b) Background Art

Robots, which are operated based on an operation by workers or predetermined control logics, are used in various industrial fields for work which humans cannot do or of which the efficiency is increased by using robots. There are various robots, including robots that lift up heavy objects while moving on rails disposed along the work lines. However, these types of robots are substantially heavy and large in size, and are thus inconvenient for being operated by a human.

Accordingly, recently, wearable robots that enable workers wearing the robot to lift and move substantially heavy objects without difficulty when they lift and assemble the objects, by assisting the workers to move, have been developed. The wearable robots include a plurality of driving motors operated in accordance with movement or operation of workers, but the driving motors provided for all joints increase the weight of the wearable robots. Accordingly, a plurality of wires are used for operating the joints to minimize the number of the driving motors and to move the joints by a minimal number of driving motors.

A proposed structure of the related art includes a base, a plurality of fingers coupled to the base, a driving unit that drives the fingers, and wires that transmit force to the fingers. However, even by the related art, it may be difficult to prevent high pressure from being instantaneously applied to the wires by rotation of the drive motors that instantaneously operate. Accordingly, shock may be applied to the joints of the robot by shock applied to the wires due to substantially high loads instantaneously applied to the wires or instantaneous movement of the joints connected with the wires.

The description provided above as a related art of the present invention is merely for helping understanding the background of the present invention and should not be construed as being included in the related art known by those skilled in the art.

SUMMARY

The present invention provides an apparatus for variable shock absorption which may absorb shock more smoothly while attenuating shock instantaneously applied to wires.

An aspect of the present invention provides an apparatus for variable shock absorption, which may include: a pair of elastic members that cross each other; a first support with both ends coupled to predetermined first ends of the elastic members; and a second support facing the first support and having oblong grooves in which the other ends (e.g., second ends) of the elastic members are inserted to slide in opposite directions. When an external force is applied to the first support or the second support, the distance between the first support and the second support may change and the angle formed by the pair of elastic members may change based on the change of the distance between the supports.

The first support may be a housing that has a groove therein with a front open and the second support may be inserted into the groove through the front of the first support and may slide therein. The first support and the second support may be rectangular boxes and open fronts of the supports may be arranged to face each other. The oblong grooves may be formed perpendicular to the movement direction of the second support. Additionally, the oblong grooves may be formed on a top and a bottom of the second support, respectively, to face each other. The elastic members may apply compression force to the elastic members, when the first support and the second support move away from each other. Predetermined ends of the elastic members may be coupled to a backside in the first support, at both ends of the backside, respectively. Further, a plurality of rollers may be disposed at the other ends (e.g., second ends) of the elastic member, and may be inserted to slide in the oblong grooves.

According to the apparatus for variable shock absorption having the structure described above, since a load instantaneously applied to wires may be gradually absorbed to prevent shock from being applied to the wires, it may be possible to prevent the wires from being damaged and a substantially large load from being applied to the part connected with the wires. Since the structure is simplified in comparison to the related art, it may be possible to remove shock applied to the wires even without substantially increasing the size and the weight of the apparatus.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

Figures 1A, 1B:
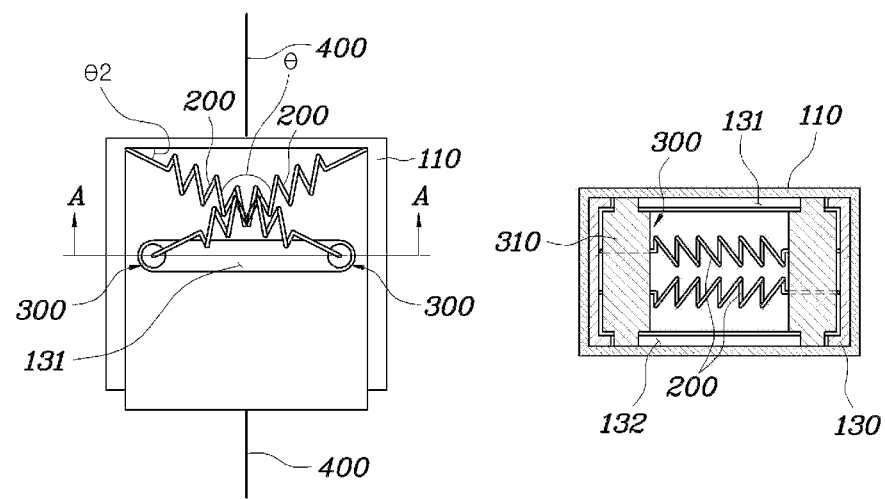
FIGS. 1A and 1B are exemplary views illustrating the configuration of an apparatus for variable shock absorption according to an exemplary embodiment of the present invention.

It should be understood that the accompanying drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof. As used herein, the term "and/or" includes any and all combinations of one or more of the associated listed items.

An apparatus for variable shock absorption according to exemplary embodiments of the present invention is described hereafter with reference to the accompanying drawings.

FIGS. 1A and 1B are exemplary views illustrating the configuration of an apparatus for various shock absorption according to an exemplary embodiment of the present invention, in which FIG. 1A is an exemplary view from above and FIG. 1B is an exemplary view showing the cross-section of line A-A. Referring to FIGS. 1A and 1B, an apparatus for variable shock absorption according to an exemplary embodiment of the present invention may include: a pair of elastic members 200 that cross each other; a first support 110 having both ends coupled to predetermined ends (e.g., first ends) of the elastic members 200; and a second support 130 that faces the first support 110 and has oblong grooves 131 and 132 into which the other ends (e.g., second ends) of the elastic members 200 are inserted to slide in opposite directions. When an external force F is applied to the first support 110 or the second support 130, the distance between the first support 110 and the second support 130 may change and the angle θ formed by the pair of elastic members 200 may change based on the change of the distance between the supports 110, 130.

In particular, the first support 110 may be a housing that has a groove therein with the front open (e.g., a front of the housing is open to the exterior and is not enclosed) and the second support 130 may be inserted into the groove through the front of the first support 110 and may slide therein. Further, the first support 110 and the second support 130 may be rectangular boxes and the open fronts of the supports 110 and 130 may be arranged to face each other. In other words, since the second support 130 may be inserted in the first support 110 with the open fronts facing each other, the second support 130 may slide forward and backward within the first support 110, and the elastic members may be disposed inside the first support 110 and the second support 130 and may connect the first support 110 and the second support 130. Further, since four sides of the second support 130 may be stably supported while sliding, the second support 130 may be prevented from moving forward and backward and left and right, that is, vertically, to allow for stable sliding. Although the second support 130 may be inserted in the first support 110, it is not limited thereto and the first support 110 may be inserted in the second support 130.

Further, a plurality of wires 400 that connect a driving motor and the joint of a wearable robot may be coupled to the backs of the supports 110 and 130 (e.g., a back side of each support) to allow the supports 110 and 130 to move in opposite directions, that is, the second support 130 may be drawn out of the first support 110, when an external force F is applied to the wires 400. Accordingly, shock applied to the wire 400 may be absorbed using the contracting restoring force of the elastic members 200.

The oblong grooves 131 and 132 may be formed in the left-right direction (e.g., horizontal) on the second support 130, facing the top and the bottom of the second support 130, respectively, and a pair of rollers 300 may be disposed inside the second support 130, with one end (e.g., a first end) in the top oblong groove 131 and the other end (e.g., a second end) in the bottom oblong groove 132 of the second support 130. Since the oblong grooves 131 and 132 may be formed on the top and the bottom of the second support 130, the rollers 300 may stably slide, and accordingly, the second support 130 may slide toward the substantial center when drawn out from the first support 110 by an external force F. Therefore, the angle θ formed by the elastic members 200 may smoothly change.

Moreover, the bodies 310 to which the second ends of the elastic members 200 are coupled and the ends inserted in the oblong grooves 131 and 132 may relatively freely rotate to allow the rollers 300 to freely slide along the oblong grooves 131 and 132, even when fixed to the elastic members 200. The elastic members 200, which may apply compression restoring force, may be arranged in an X-shaped and predetermined ends (e.g., first ends) of the elastic members 200 may be coupled to the backside in the first support 110, at both ends of the backside, that is, left and right ends, respectively.

Figure 2:
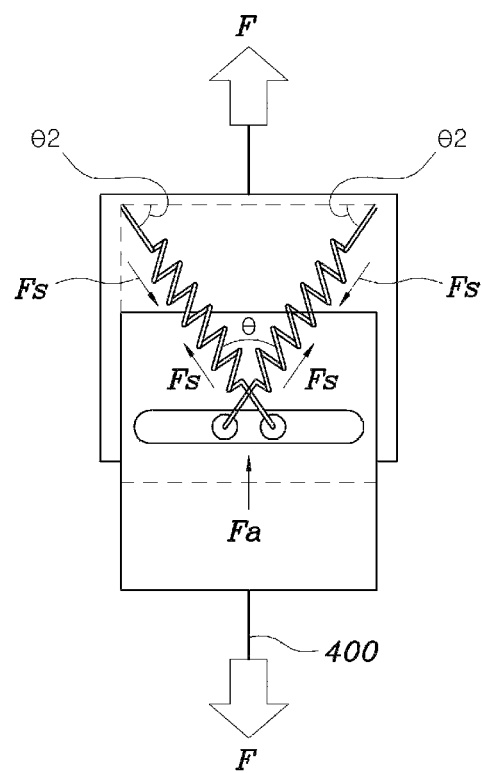
FIG. 2 is an exemplary view illustrating the operation of the apparatus for variable shock absorption according to an exemplary embodiment of the present invention.

Since the elastic members 200 may be arranged in the X-shaped, when the second support 130 is drawn out by an external force F, as shown in FIG. 2, the elastic members 200 may be extended and the angle θ between the elastic members 200 may change. Further, as the distance between the first support 110 and the second support 130 increases, the elastic members 200 may be further extended and the angle θ between the elastic members 200 may decrease. In other words, as the distance between the first support 110 and the second support 130 increases, the compression restoring force may increase in the reduction direction of the distance. Comparing FIGS. 1A, 1B, and 2, when Fs is the compression restoring force of the elastic members 200, Fa is compression restoring force in the reduction direction of the distance, n is the number of the elastic members 200, and θ is the angle formed by a pair of the elastic members 200, Fa may be obtained from the following equation.

$$Fa = n \times Fs \times \cos\frac{\theta}{2} \qquad \text{Equation 1}$$

Since the backside of the first support 110 and Fa may be perpendicular, θ/2 in Equation 1 is about the same as $\theta_2$ that is the angle between the elastic members 200 and the backside of the first support 110, so Equation 1 may be expressed into the following equation as well.

$$Fa = n \times Fs \times \sin\theta_2 \qquad \text{Equation 2}$$

Since Fs may be in proportion to the extended length of the elastic members 200, comparing FIGS. 1A, 1B, and 2, Fs may be greater, θ may increase, and $\theta_2$ may increase when the second support 130 is drawn out by an external force F than Fs, θ, and, $\theta_2$ the second support 130 is drawn out, and thus Fa may further increase.

Figure 3:
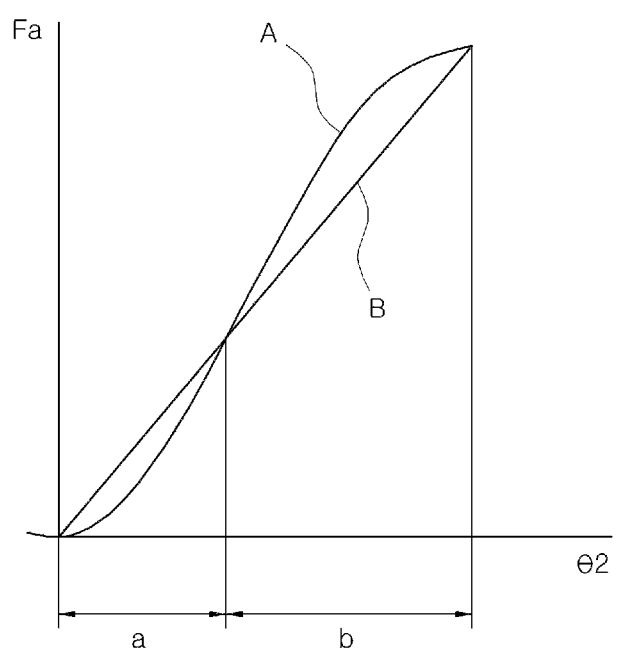
FIG. 3 is an exemplary graph showing the shock absorption ability of the apparatus for variable shock absorption according to an exemplary embodiment of the present invention.

Further, Equation 2 is plotted in the graph shown in FIG. 3, in which A shows the apparatus for variable shock absorption according to an exemplary embodiment of the present invention and B shows that the elastic members 200 may be formed in the sliding direction of the second support 130. FIG. 3 shows that Fa is greater in B than in A from the start of shock and the shock due to an external force F is rapidly absorbed, but in the case of A, when shock is generated, the shock may be gradually absorbed in the early stage "a" and may increase more than that in B in the section b, so the degree of absorbing the shock may increase. In other words, when an instantaneous load is applied to the wires, the shock may be gradually absorbed.

As described above, since the ends of the elastic members 200 may be coupled to the backside in the first support 110, at the left and right ends, respectively, θ or θ$_2$ may be further changed when the second support 130 is drawn out, so the effect of gradually absorbing shock may be more increased. Although the apparatus may be coupled to wires that are used when a wearable robot is operated in the description of the exemplary embodiment, the apparatus may be disposed between two fixing portions where tensile force may be exerted and shock is be absorbed in industrial machines and may be used in various fields, in addition to wearable robots.

According to the apparatus for variable shock absorption having the structure described above, since a load instantaneously applied to wires may be gradually absorbed to prevent shock from being applied to the wires, it may be possible to prevent the wires from being damaged and a substantial load from being applied to the part connected with the wires. Since the structure is simplified compared to the related art, it may be possible to remove shock applied to the wires even without substantially increasing the size and the weight of the apparatus.

Although the present invention was described with reference to exemplary embodiments shown in the drawings, it is apparent to those skilled in the art that the present invention may be changed and modified in various ways without departing from the scope of the present invention, which is described in the following claims.

What is claimed is:

1. An apparatus for variable shock absorption, comprising:
   a pair of elastic members that cross each other;
   a first support having both ends coupled to predetermined first ends of the elastic members; and
   a second support that faces the first support and has a plurality of oblong grooves in which second ends of the elastic members are inserted to slide in opposite directions,
   wherein when an external force is applied to the first support or the second support, the distance between the first support and the second support changes and the angle formed by the pair of elastic members changes based on the change of the distance between the first support and the second support; and
   wherein the first support is a housing that has a groove therein with an open front and the second support is inserted into the groove through the front of the first support and slides therein.

2. The apparatus of claim 1, wherein the first support and the second support are rectangular boxes and have open fronts being arranged to face each other.

3. The apparatus of claim 1, wherein the oblong grooves are formed perpendicular to the movement direction of the second support.

4. The apparatus of claim 2, wherein the oblong grooves are formed on a top and a bottom of the second support, respectively, to face each other.

5. The apparatus of claim 1, wherein the elastic members apply a contraction restoring force to the elastic members, when the first support and the second support move away from each other.

6. The apparatus of claim 1, wherein predetermined first ends of the elastic members are coupled to a backside in the first support, at both ends of the backside.

7. The apparatus of claim 1, wherein a plurality of rollers are disposed at the second ends of the elastic member, and are inserted and slide in the oblong grooves.

* * * * *